United States Patent
Williams et al.

(10) Patent No.: US 7,448,267 B2
(45) Date of Patent: Nov. 11, 2008

(54) TIRE BALANCING APPARATUS

(75) Inventors: Thomas D. Williams, Hudson, OH (US); Steve Haydu, Uniontown, OH (US); Ronald Jan Hall, Milford, MI (US); Steve Watson, Ravenna, OH (US); Bill Shaffer, Tallmadge, OH (US); Neal Nehrenz, Barberton, OH (US); James Beebe, Brimfield, OH (US)

(73) Assignee: Micro-Poise Measurement Systems, LLC, Akron, OH (US)

( * ) Notice: Subject to any disclaimer, the term of this patent is extended or adjusted under 35 U.S.C. 154(b) by 223 days.

(21) Appl. No.: 11/103,090

(22) Filed: Apr. 11, 2005

(65) Prior Publication Data
US 2006/0016258 A1 Jan. 26, 2006

(51) Int. Cl.
*G01M 1/16* (2006.01)
(52) U.S. Cl. .......................................... 73/462; 73/487
(58) Field of Classification Search .................. 73/462, 73/487
See application file for complete search history.

(56) References Cited

U.S. PATENT DOCUMENTS 3,589,203 A * 6/1971 Hines .......................... 474/121

(Continued)

FOREIGN PATENT DOCUMENTS

EP 0 797 086 A 9/1997
JP 09 126935 A 5/1997

OTHER PUBLICATIONS

PCT International Search Report and Written Opinion for PCT/US2005/012639, date mailed Oct. 20, 2005.
Patent Abstract of Japan, vol. 1997, No. 09, Sep. 30, 1997.

(Continued)

*Primary Examiner*—Hezron E. Williams
*Assistant Examiner*—Samir M. Shah
(74) *Attorney, Agent, or Firm*—Sonnenschein Nath & Rosenthal LLP

(57) ABSTRACT

A machine and method for performing balancing measurements on a tire or tire/wheel assembly that includes a structure defining spaced apart tire centering and tire testing positions. A first conveyor moves a tire to a centering position where a shuttle assembly is operative to center the tire and, after it has been centered, engages the tire and effects the transfer of the tire from the centering station to a testing station. The shuttle assembly includes a pair of grippers that move towards and away from each other, in a lateral direction in order to engage the tire. The first conveyor permits movement of the tire in a lateral direction; whereas it substantially resists relative movement between the tire and conveyor in the longitudinal direction, i.e., the direction of movement of the conveyor. The shuttle assembly is mounted for movement in a longitudinal direction and includes a drive mechanism which allows the shuttle assembly to move relative to a tire in a longitudinal direction as the grippers engage the tire so that the shuttle assembly can align itself, in the longitudinal direction with respect to the tire. The frame structure of the machine includes three spaced apart support members providing a three point support arrangement for the machine. The machine also includes at least four legs which extend downwardly, but are spaced above a plane defined by the support members and inhibit tipping of the machine beyond predetermined limits. The testing station which includes a spindle assembly for rotating the tire also includes an elevator mechanism for lowering the tire on to the spindle and for raising the tire off the spindle. A lower marking mechanism forms part of the elevator and is operative to mark a predetermined location on the tire at the conclusion of a tire testing procedure. The spindle assembly includes a drive motor comprised of a drive motor housing and an armature. The armature is maintained in its operative position by a bearing arrangement associated with a shaft assembly forming part of the spindle assembly which eliminates the need for armature supporting bearings in the drive motor housing.

5 Claims, 14 Drawing Sheets

U.S. PATENT DOCUMENTS

| | | | |
|---|---|---|---|
| 3,681,967 A * | 8/1972 | Hines et al. | 73/1.14 |
| 4,106,964 A * | 8/1978 | DeVittorio | 156/75 |
| 4,191,055 A * | 3/1980 | Orem et al. | 73/462 |
| 4,214,481 A * | 7/1980 | Reutlinger | 73/462 |
| 4,262,536 A | 4/1981 | Orem et al. | |
| 4,890,717 A * | 1/1990 | Kane | 198/403 |
| 4,903,398 A * | 2/1990 | Sakamoto et al. | 29/703 |
| 5,048,173 A * | 9/1991 | Miller | 29/450 |
| 5,134,766 A * | 8/1992 | Miller | 29/450 |
| 5,390,540 A | 2/1995 | Mallison | |
| 5,959,204 A * | 9/1999 | Rothamel et al. | 73/462 |
| 6,016,695 A | 1/2000 | Reynolds et al. | |
| 6,079,268 A * | 6/2000 | Metzner | 73/462 |
| 6,547,338 B2 | 4/2003 | Gross et al. | |
| 6,772,626 B1 * | 8/2004 | Engel et al. | 73/146 |
| 7,191,650 B2 * | 3/2007 | Cunningham et al. | 73/462 |
| 2005/0229702 A1 | 10/2005 | Haydu | |
| 2006/0096373 A1 * | 5/2006 | Rogalla et al. | 73/487 |

OTHER PUBLICATIONS

U.S. Appl. No. 60/561,976, filed Apr. 14, 2004, "Tire Balancing Apparatus".

U.S. Appl. No. 60/561,974, filed Apr. 14, 2004, "Tire Weight Applying Apparatus".

PCT International Search Report and Written Opinion for PCT/US2005/012353, date mailed Aug. 16, 2005.

\* cited by examiner

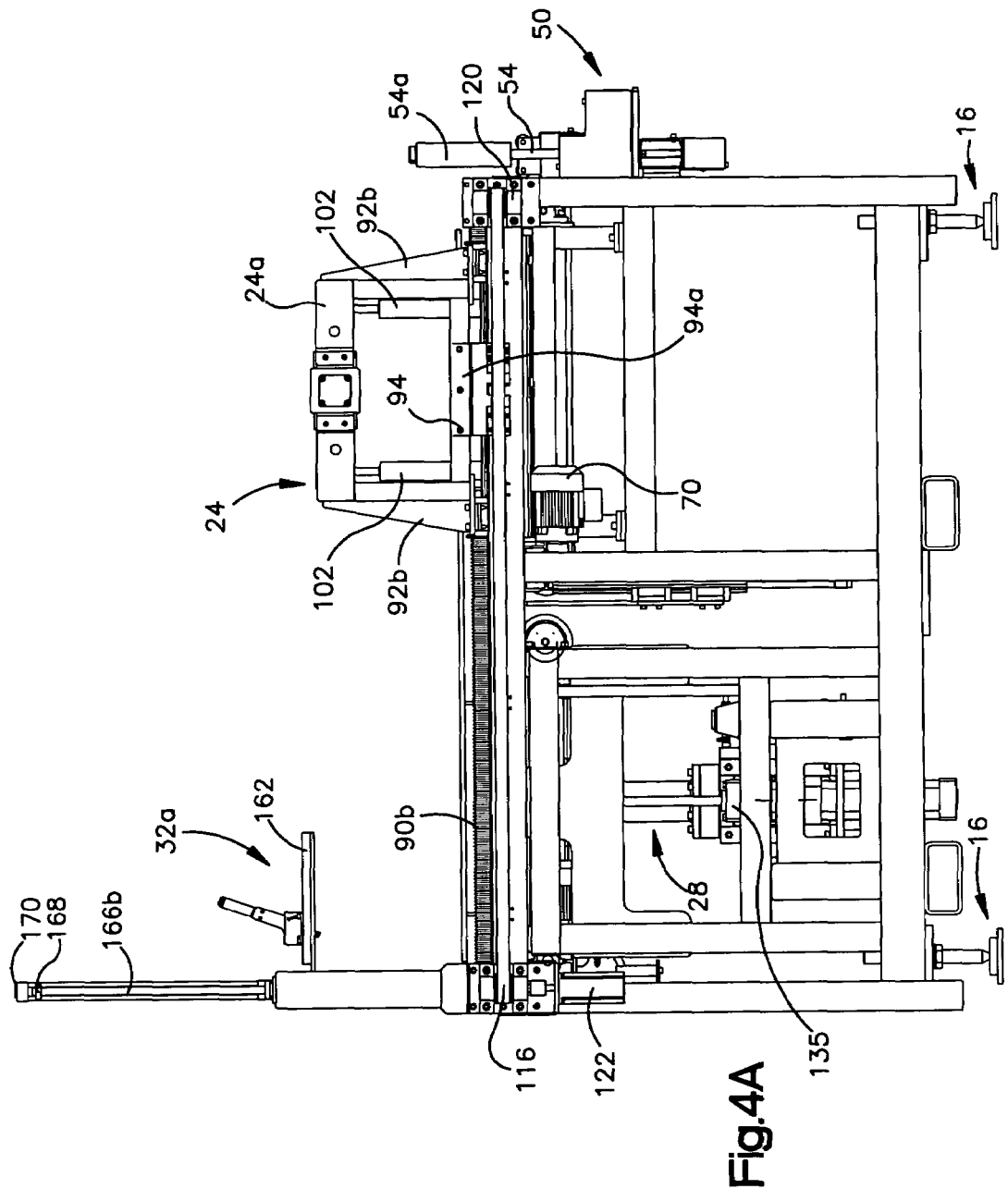

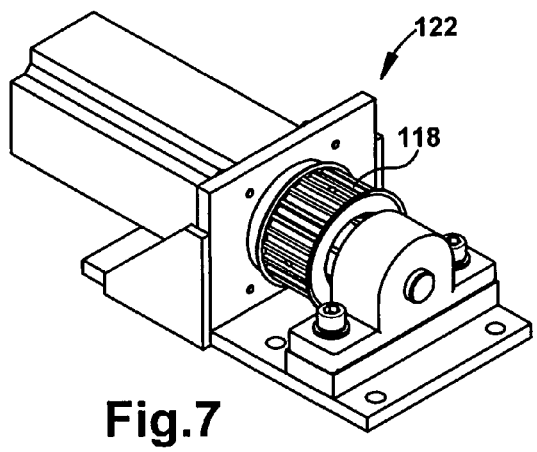
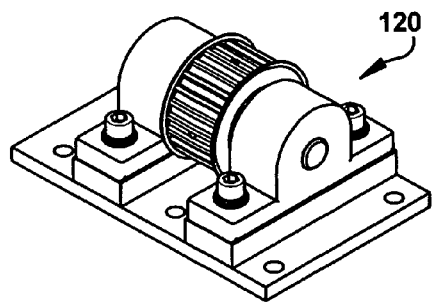
Fig.7  Fig.8
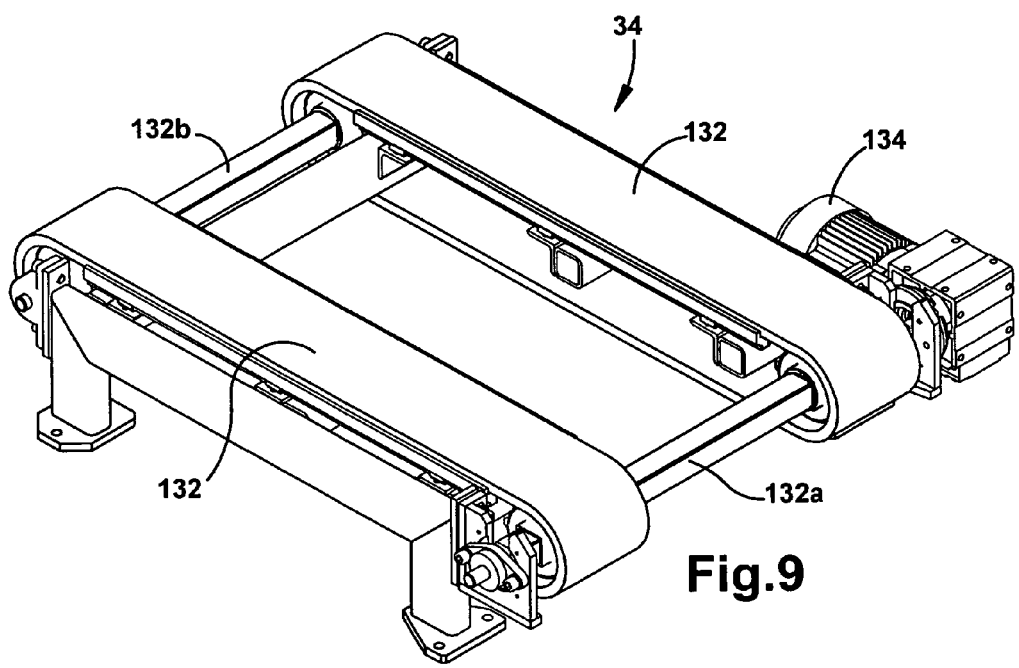
Fig.9

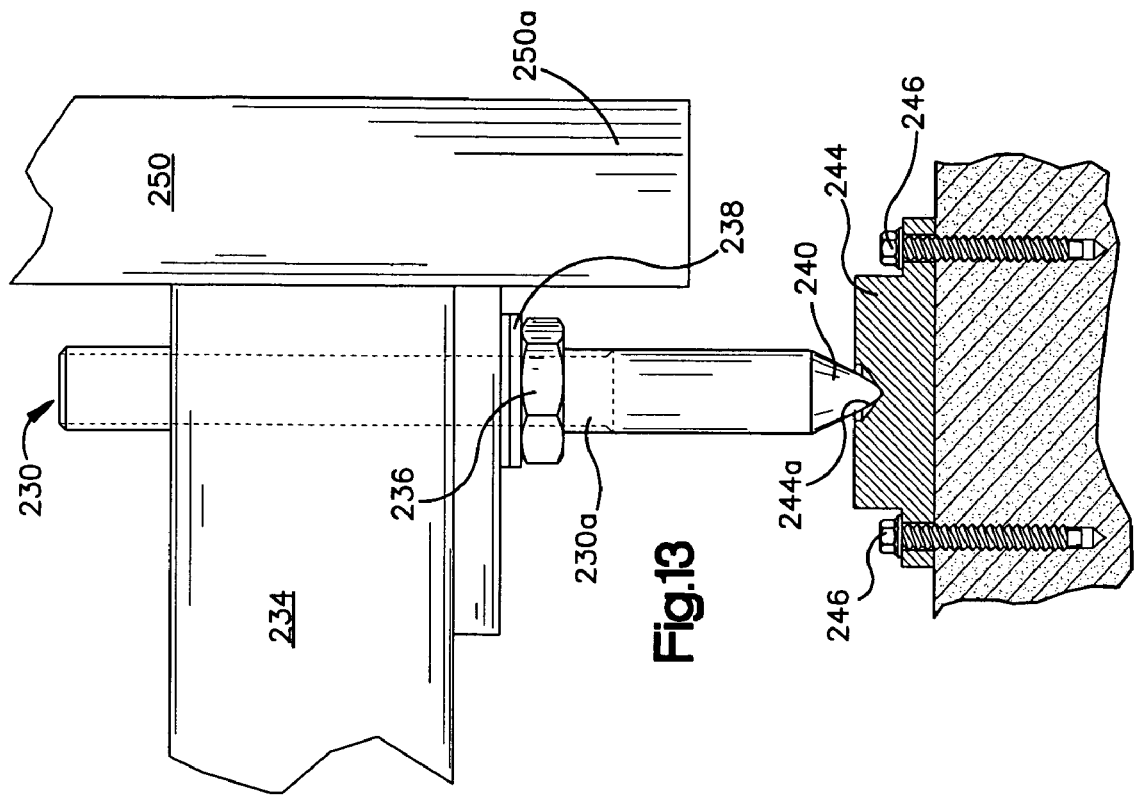
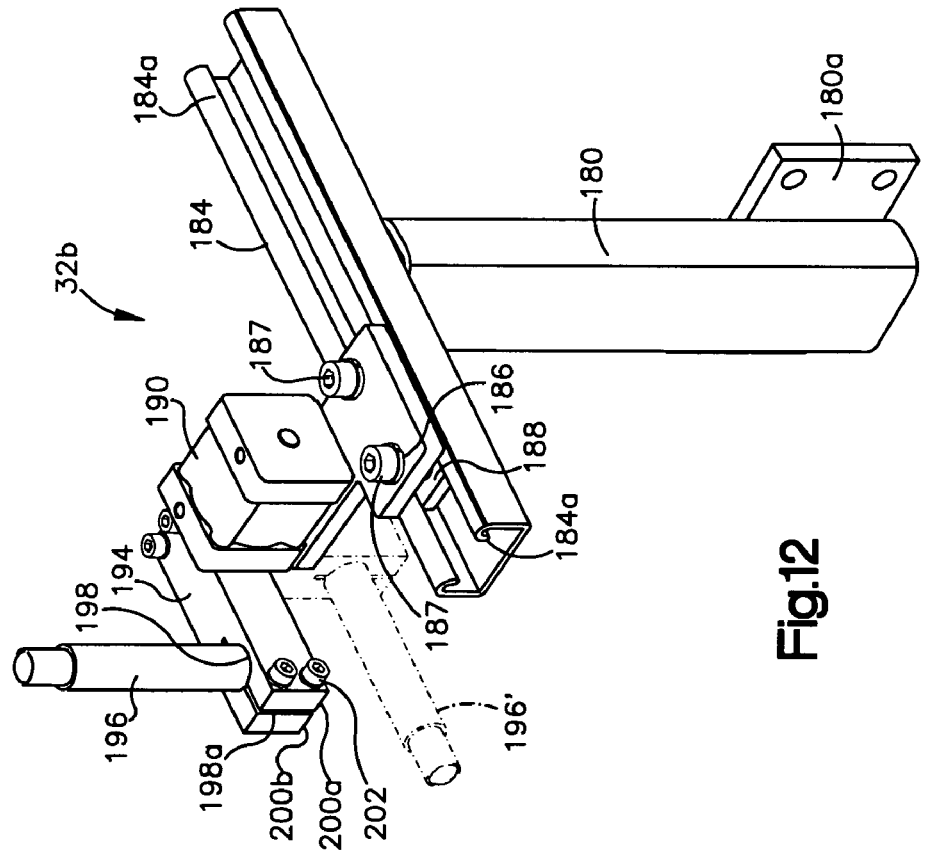

TIRE BALANCING APPARATUS

TECHNICAL FIELD

The present invention relates generally to the balancing of tire/wheel assemblies and, in particular, to a method and apparatus for determining the locations and amount of corrective wheel weights that need to be installed on a tire/wheel assembly to correct an imbalance condition.

BACKGROUND ART

Tire/wheel assemblies are typically balanced by vehicle manufacturers prior to the installation of the tire assemblies on the vehicle. Equipment for testing the balance of tire/wheel assemblies is currently available. These testing machines generally comprise a spindle that rotates the tire/wheel assembly. The spindle is coupled to force sensors, such as load cells, which provide signals that are used to determine the location and amount of wheel weights required to correct an imbalance condition in the tire assembly. Typically, the locations where wheel weights are to be installed are marked on the tire and/or wheel. The marked wheel is then conveyed to a weight applying station where the corrective wheel weights are installed.

Balancing machines and systems are currently available that determine an imbalance condition on a tire/wheel assembly and mark a location or locations where corrective wheel weights need to be installed. Examples of the type of machines currently available can be found in U.S. Pat. Nos. 4,191,055 and 4,262,536, both of which are hereby incorporated by reference. For at least some types of currently available machines, the tire/wheel assembly size that can be tested is limited. In other types of machines, considerable downtime is encountered when the machine needs to be adjusted for a different size tire/wheel. Still other machines have unacceptably long cycle times and, as a result, have a low throughput. Today vehicle manufacturers that use this type of equipment require balancing machines that have high throughput and require minimal set-up time. Manufacturers also demand machines that can accommodate a wide range of tire/wheel sizes, operate with high reliability and have low maintenance costs.

DISCLOSURE OF INVENTION

The present invention provides a new improved method and apparatus for determining a balance condition in a tire, wheel or a tire/wheel assembly. In the illustrated embodiment, the disclosed apparatus provides a highly automated machine that includes a test station where a tire/wheel assembly is rotated by a spindle assembly. The spindle assembly is connected to sensors, such as load cells, which are used to determine where corrective weights need to be installed on the tire/wheel assembly, along with the magnitude of those weights. The locations for those wheel weights may be marked by marking devices forming part of the apparatus. The present invention also includes a shuttle device for both centering a tire with respect to the spindle assembly and subsequently conveying the centered tire/wheel assembly to the test location.

According to a preferred embodiment of the invention, a machine is disclosed that performs balancing measurements on a tire, wheel or a tire/wheel assembly. The machine includes a frame structure that defines tire centering and tire testing positions that in the illustrated embodiment are spaced apart. A conveyor conveys a tire to be tested to the centering position and supports the tire while it is being centered. A shuttle is operative to center the tire to be tested and is further operative to engage the tire during the centering step and while maintaining engagement with the tire, conveys the tire from the centering position to the testing position. A second conveyor, preferably forms part of an elevator mechanism located at the testing station. The elevator mechanism raises and lowers the tire with respect to the spindle assembly, while the second conveyor is operative to discharge the tire after a testing cycle. It should be noted here that the term "tire" is in most instances is intended to refer to a tire alone, a wheel alone on which a tire could be mounted and a tire/wheel assembly.

According to a feature of the invention, the first conveyor permits movement of a tire in a lateral direction during a centering operation while substantially resisting relative movement between the tire and the conveyor in a longitudinal direction, i.e., the direction of movement for the conveyor when a tire is being advanced to the testing station. In a more preferred embodiment, this feature is achieved by a plurality of rollers that form part of the first conveyor which have their axes of rotation oriented in the longitudinal direction. With this configuration, a tire is supported by the rollers and moves relatively easily in the lateral direction, but is inhibited from moving in the longitudinal direction since that would require that the tire move relative to the rollers in a direction parallel to their axes of rotation.

In the illustrated embodiment, the shuttle assembly includes a pair of grippers that are concurrently movable towards and away from each other in the lateral direction. In operation, the grippers move towards each other in order to engage a tire located at the centering station. According to a feature of this embodiment, the shuttle assembly is mounted for movement in the longitudinal direction and includes a drive mechanism for effecting the movement. According to the preferred embodiment, the drive mechanism permits the shuttle assembly to move in a longitudinal direction during a centering operation in order to enable the shuttle to move to a longitudinally aligned position with respect to the tire as the grippers engage the tire.

According to another feature of the invention, the frame structure for the machine includes three spaced apart ground engaging support members which together form a three point support arrangement for the machine. This support arrangement increases stability of the machine. In the illustrated embodiment, each support member includes a stud, the lower end of which terminates in a cone-shaped surface. The cone-shaped surface is received in a complementally-shaped surface recess formed in a ground engaging receiver member.

According to a further feature of this embodiment, the frame structure includes at least four legs that extend downardly from the frame structure. The legs are spaced above a ground engaging plane defined by the three spaced apart ground engaging support members. These leg segments inhibit tipping of the machine beyond predetermined limits. If the machine tips, at least one of the legs will engage the floor or base that is engaged by the support members in order to inhibit further tipping.

In the exemplary embodiment, the elevator for lowering the tire on to the spindle and for raising the tire off the spindle includes a pair of slides for supporting an elevator frame. A sensor senses the position of the elevator frame and a fluid pressure operated actuator effects reciprocal movement, preferable vertical movement, in the frame. The actuator includes a brake mechanism which in the preferred embodiment is a brake associated with an extensible rod forming part of the actuator. The brake arrests movement in the rod when the frame is in a predetermined position as sensed by the sensor. In the illustrated embodiment, the actuator is a pneumatic actuator.

According to a feature of the preferred embodiment, the elevator also includes a marking mechanism for placing a mark at a predetermined location on a tire or wheel held by the spindle assembly. The location where a mark is to be placed is determined during a testing cycle when the tire is rotated by a spindle assembly and sensors, such as load cells determine points of imbalance on the tire. After the points of imbalance are determined, a controller rotates the tire so that a location on the tire or wheel where an imbalance condition has been determined is aligned with the marking mechanism. The marking mechanism is then activated to place the mark at this location on the lower side (generally the "non-curb" side) of the tire or wheel. When the machine is used to check the balance condition of a tire/wheel assembly, the marking mechanism marks the location on the wheel where a corrective weight needs to be installed.

In the preferred and illustrated embodiment, the machine also includes an upper marking mechanism which is operative to place a mark at a predetermined location on the upper side (generally the "curb" side) of the tire or tire/wheel assembly.

According to another feature of the invention, the disclosed spindle assembly includes a shaft assembly that is rotatably supported by a bearing arrangement located within a bearing housing. A clamping mechanism for engaging a tire or a tire/wheel assembly to be rotated is located at an upper end of the shaft assembly; whereas the bearing housing is located below the clamping mechanism. A drive motor including a drive motor housing and an armature is operative to drivingly rotate the shaft assembly. The armature is coupled to the shaft assembly, such that the armature is maintained in its operative position within the motor housing by the bearing arrangement that rotatably supports the shaft assembly. With the present invention, separate drive motor bearings that would ordinarily be located between the motor housing and the armature are eliminated. This reduces maintenance of the spindle assembly and improves its reliability.

According to the preferred method of the invention, a tire (or tire/wheel assembly) to be measured is advanced to the centering station. The shuttle assembly and, in particular, the grippers are operated to center the tire with respect to a spindle assembly. The centered tire is then engaged by the shuttle assembly and transferred from the centering position to the testing position. The tire is then released from the shuttle assembly and is engaged by the spindle assembly whereupon the spindle assembly is activated to rotate the tire. Preferably, the tire is lowered onto and raised from the spindle assembly by an elevator located at the testing station. In the preferred operation, the elevator is only lowered a sufficient amount to provide clearance between a lower side of the tire and the elevator. After the tire (or tire/wheel assembly) is tested, a conveyor forming part of the elevator discharges the tire from the testing station after it has been raised off the spindle assembly by the elevator.

In a more specific embodiment of the preferred method, the elevator is provided with a marking mechanism and at the conclusion of a testing cycle the tire is rotated by the spindle to a position at which a predetermined location on the tire is aligned with the marking mechanism. The marking mechanism is then activated to place a mark at the predetermined location. When the machine is used to test tire/wheel assemblies, the marking mechanism places a mark at the location on a wheel where a corrective weight needs to be installed.

In the preferred embodiment, the marking mechanism is moved along a path such that the mark placed on the wheel is in the form of a line segment.

Additional features of the invention and a fuller understanding will be obtained by reading the following detailed description made in connection with the accompanying drawings.

BRIEF DESCRIPTION OF DRAWINGS

FIG. 4A is a side elevational view as seen from the plane indicated by the line 4A-4A in FIG. 2;

FIGS. 7 and 8 illustrate a belt drive assembly and idler pulley assembly, respectively forming part of the machine;

FIG. 9 is a perspective view of an exit conveyer forming part of the machine;

FIG. 12 is a perspective view showing the construction of a lower marking assembly constructed in accordance with the preferred embodiment of the invention;

FIG. 13 is a fragmentary, partially sectional view of a mounting member forming part of the machine shown in FIG. 1;

BEST MODE FOR CARRYING OUT THE INVENTION

Figure 1:
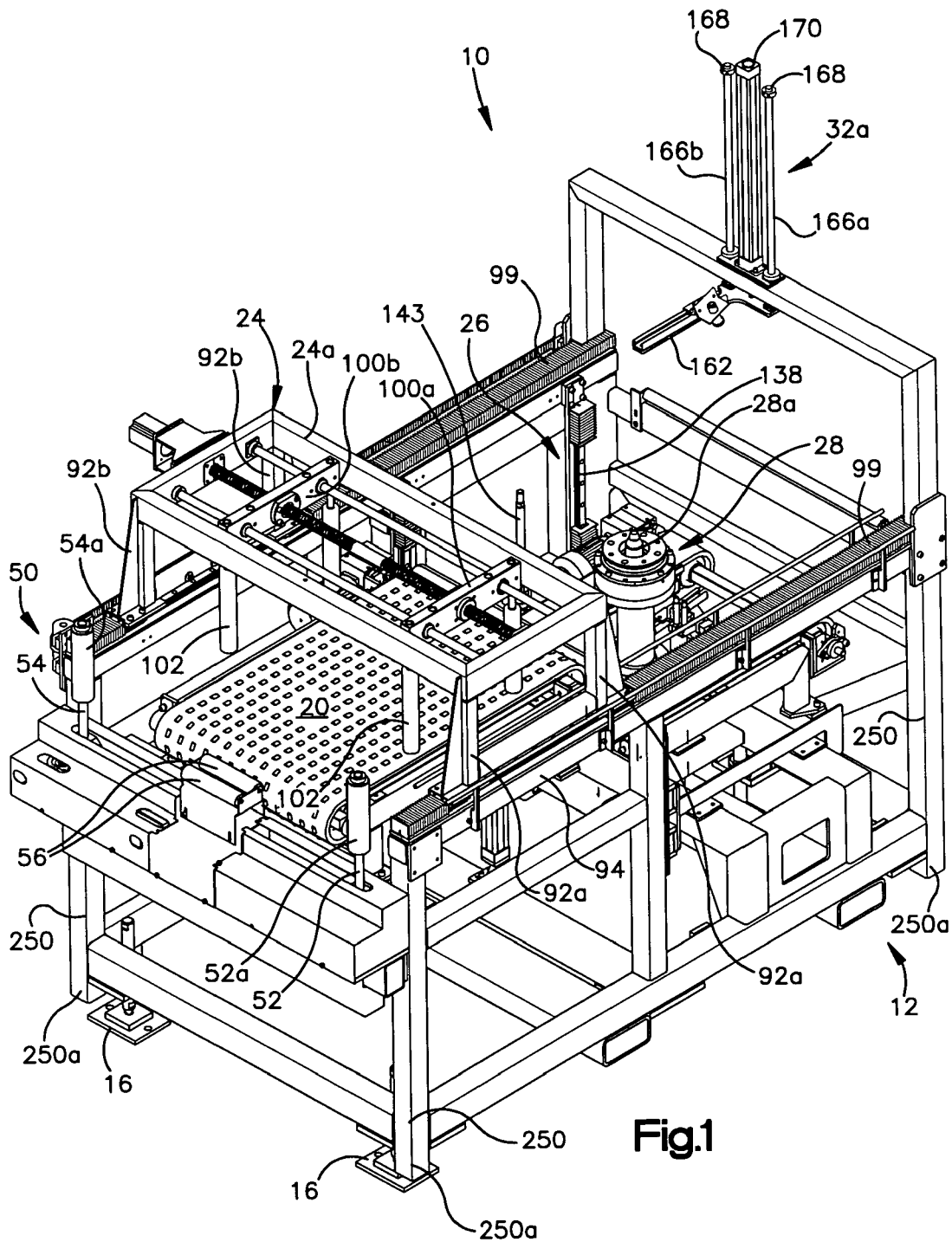
FIG. 1 is a perspective view of a balancing test machine constructed in accordance with the preferred embodiment of the invention.
Figure 2:
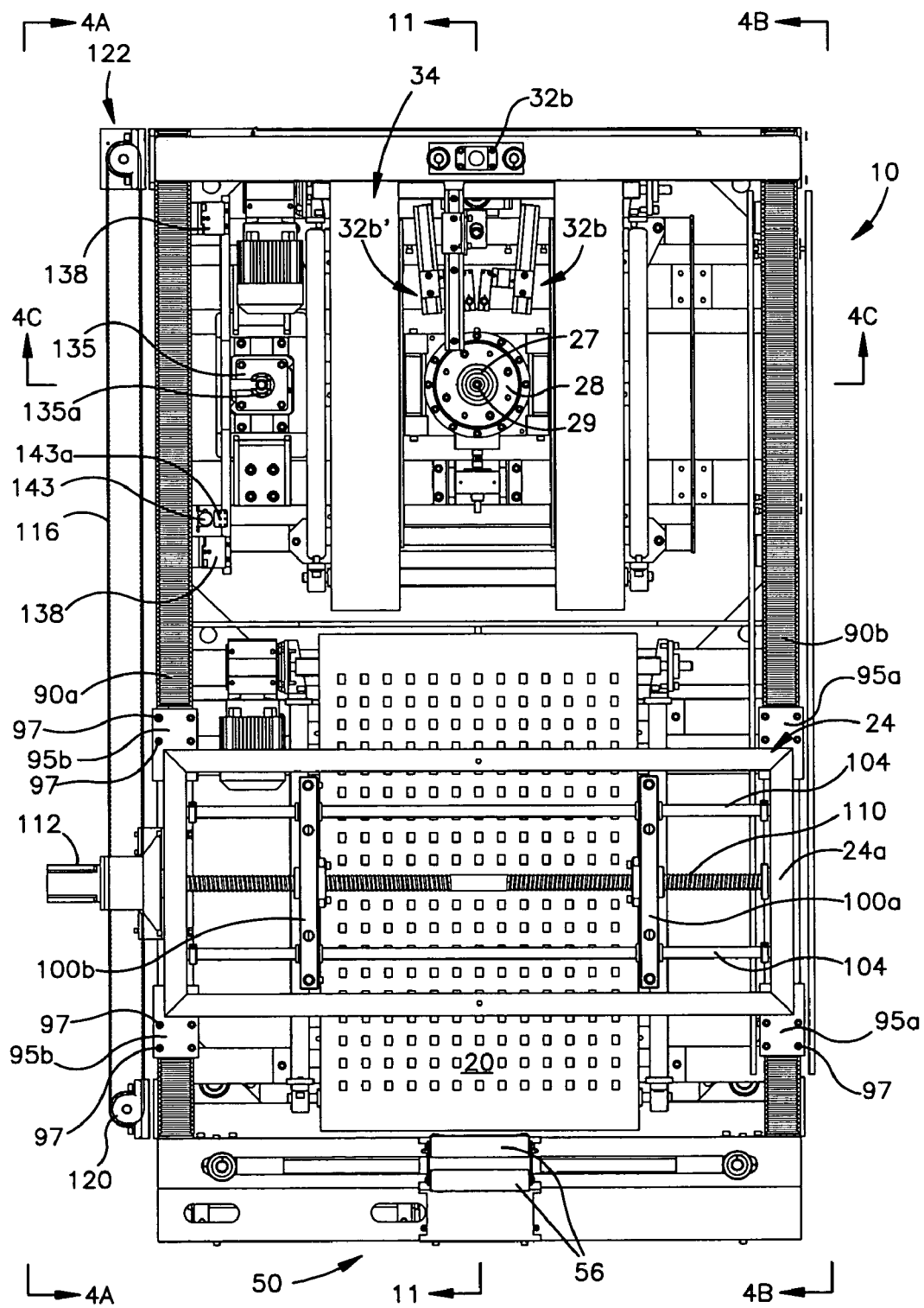
FIG. 2 is a top plan view of the machine shown in FIG. 1.
Figure 3:
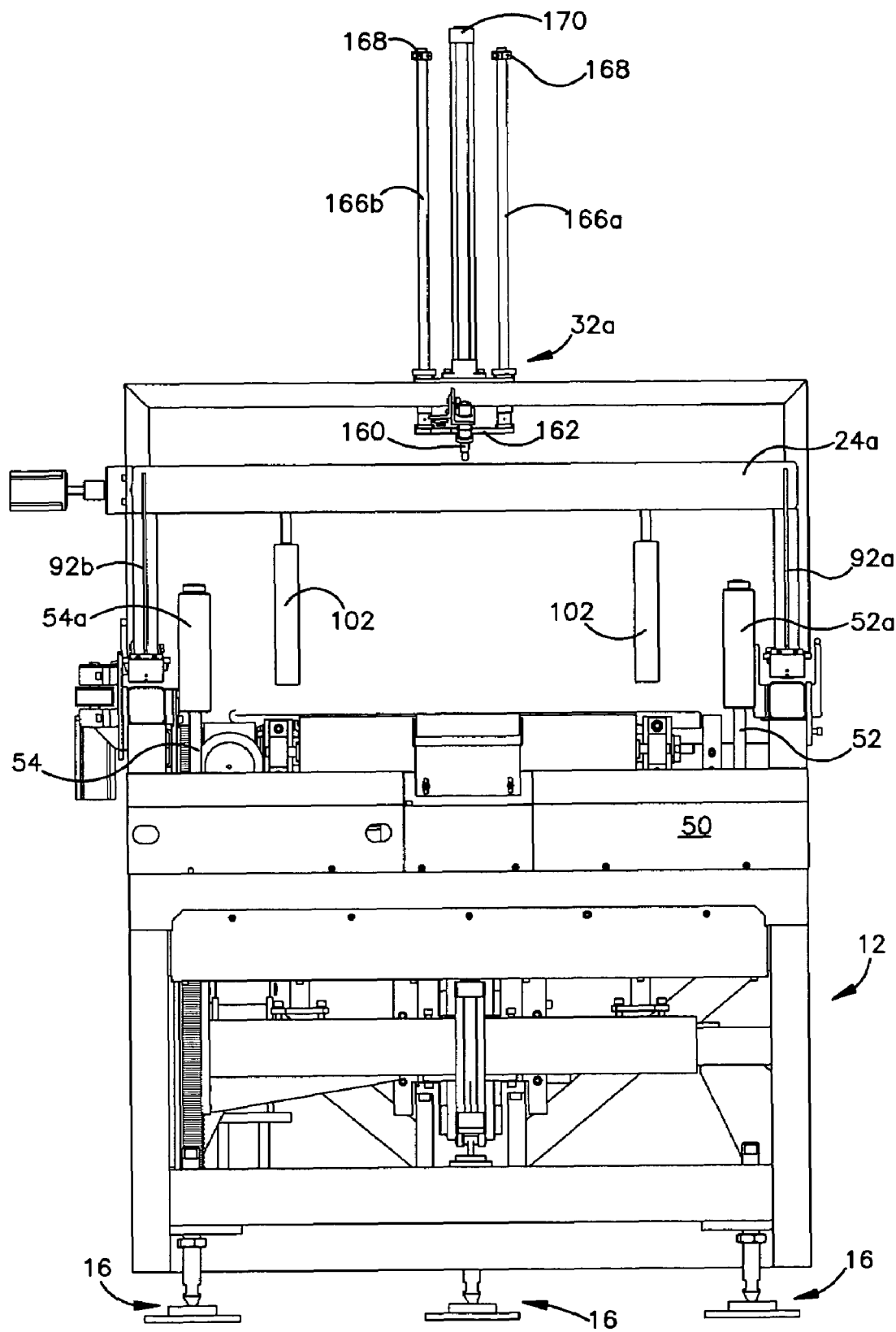
FIG. 3 is an end view of the machine shown in FIG. 1.

FIG. 1 illustrates the overall construction of a dynamic balancing machine 10 for determining balance (or imbalance) conditions in a tire/wheel assembly. Referring also to FIGS. 2 and 3, the machine 10 includes a base indicated generally by the reference character 12 that is supported on a plant floor via support members 16 that form a three point or triangular support system (shown best in FIG. 3).

The machine includes an entrance conveyor 20 and a tire shuttle 24 which through coordinated movement with the conveyor 20 delivers a tire/wheel assembly 22 (shown in FIG. 4C) to a balancing test station indicated generally by the reference character 26; the balancing test station 26 includes a rotatable spindle 28a forming part of a spindle assembly 28.

The machine also includes upper and lower tire marking mechanisms indicated generally by the reference characters 32a, 32b, respectively (see FIG. 2). At the conclusion of the balancing test cycle, an exit conveyor indicated generally in FIG. 2 by the reference character 34 conveys the tire/wheel assembly out of the balancing test station 26 and delivers it to other processing equipment in the plant, such as a weight applying station where appropriate wheel weights for correcting the imbalance found by the machine 10 are installed at the positions determined by the balancing machine. An example of a weight applying station is disclosed in concurrently filed, provisional patent application entitled "Tire Weight Applying Apparatus," Ser. No. 60/561,974, filed Apr. 14, 2004, which is hereby incorporated by reference.

In general, the sequence of operation for the disclosed dynamic balancing machine 10 is as follows. A tire/wheel assembly 22 is delivered from other tire handling equipment to the entrance conveyor 20. The other equipment may, for example, include a conveyor (not shown) for delivering a tire/wheel assembly from a machine that mounts the tire to the wheel. The entrance conveyor 20 moves the tire/wheel assembly 22 to a centering location where the entrance conveyor 20 in cooperation with the shuttle 24, centers the tire laterally with respect to the spindle assembly 28. At the conclusion of the centering step, the tire assembly 22 is gripped by the shuttle mechanism and through coordinated movement with the entrance conveyor 20 and exit conveyor 34, delivers the tire to a position axially aligned with the rotational axis 29 (FIG. 2) defined by the spindle assembly 28. The tire assembly 22 is then lowered onto tooling 27 (FIG. 2) forming part of the spindle 28 (by a mechanism to be described) and once on the tooling, the tooling operates to rigidly clamp the tire assembly 22 to the spindle 28a so that the spindle and tire assembly 22 can rotate as a unit.

The spindle 28a is then energized to rotate the tire assembly 22. While rotating, data acquisition devices such as load cells operatively connected to the spindle assembly 28 determine the magnitude and locations of imbalance on the tire assembly 22. At the conclusion of the data acquisition step, the tire is preferably rotated to a first position where a point of imbalance on the outside (curb side) of the tire/wheel assembly is aligned with the upper marking mechanism 32a and while in that position, the marker mechanism 32a is energized to place a weight location mark on the tire assembly 22 (see FIG. 16). The tire assembly 22 is then preferably rotated so that the point of imbalance on the underside of the tire assembly is aligned with the lower marking mechanism 32b and while at that position, the lower marking mechanism 32b is energized to mark the point of imbalance on the underside of the tire assembly 22 (also shown in FIG. 16). At the completion of the marking step, the tire is then discharged from the machine by the exit conveyor 34.

Figure 5:
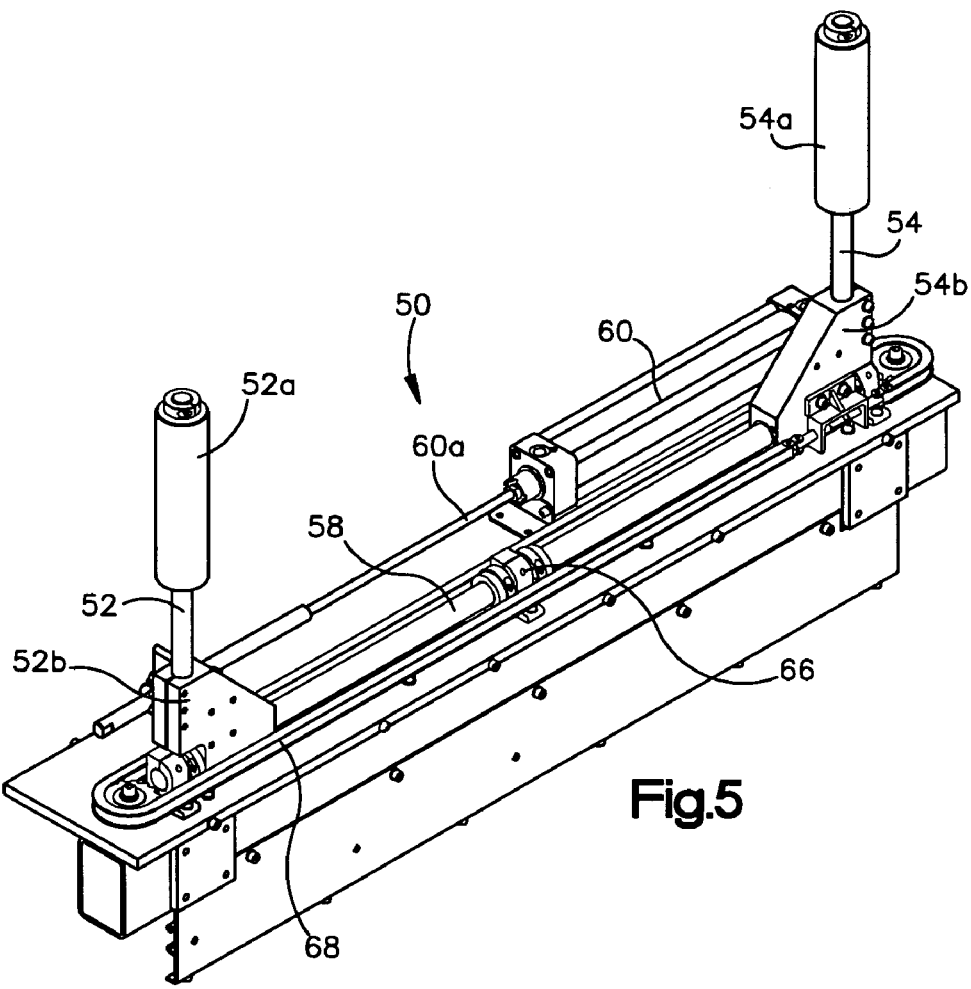
FIG. 5 is a perspective view of a stop mechanism forming part of the machine shown in FIG. 1.

Returning to FIG. 1, details of the machine will now be explained. The entrance to the machine includes a stop mechanism 50 for inhibiting movement of a tire assembly onto the entrance conveyor 20 until the machine is prepared to accept the tire assembly i.e. when the machine is ready to commence a balancing test cycle. Referring also to FIG. 5, the stop assembly 50 includes a pair of stop pins 52, 54 that are movable towards and away from each other. The stop pins include associated rollers 52a, 54a. The stop assembly 50 also includes a pair of centrally positioned and laterally oriented support rollers 56 (shown best in FIGS. 1 and 2), which provide rolling support for a tire assembly as it moves onto the entrance conveyor 20. When the stop pins 52, 54 are in the position shown in FIGS. 1 and 5, a tire assembly is allowed to proceed onto the entrance conveyor 20. When the stop pins 52, 54 are moved towards each other to a spacing that is less than the diameter of the tire assembly that is to be balanced, the pins 52, 54 obstruct the path and the tire assembly is inhibited from moving onto the entrance conveyor 20.

As seen in FIG. 5, the stop pins 52, 54 are slidably mounted via respective support members 52b, 54b on a common slide 58. A fluid pressure operated actuator 60 is connected to the stop pin support member 52a such that extension and retraction of an associated actuating rod 60a moves the stop pin 52 towards and away from a center position indicated generally by the reference character 66. A chain or belt 68 interconnects the stop pin mounting member 52b with the stop pin mounting member 54b such that movement in the stop pin member 52 produces concurrent movement in the other stop pin member 54 so that when the actuating rod 60a is extended, both stop pin members 52, 54 move away from each other; when the actuating rod 60a is retracted, both stop members 52, 54 move towards the center position 66.

As indicated above, when the stop pins 52, 54 are moved outwardly, as shown in FIG. 1, a tire assembly 22 is allowed to proceed onto the entrance conveyor 20 and is supported by the centrally positioned, lateral rollers 56 as it moves from an upstream conveyor or other equipment onto the entrance conveyor 20.

Figure 6:
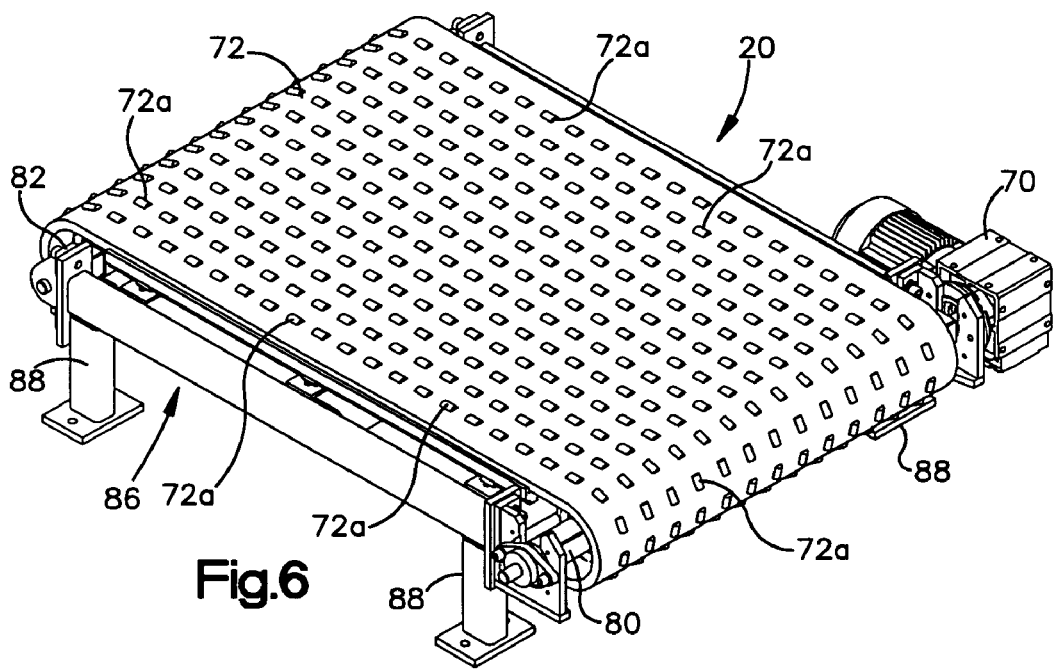
FIG. 6 is a perspective view of an entrance conveyer forming part of the balancing test machine.

Referring also to FIG. 6, the entrance conveyor 20 is driven by a drive motor 70 and includes a continuous belt 72; the belt itself includes a plurality of rollers 72a rotatable about axes that are parallel to the direction of movement of the belt 72. A belt of this type is available from Intralox Inc. and is denoted as Series 00TRT. The disclosed belt construction exerts a frictional driving force on a tire assembly 22 (when the belt 72 is moving) in order to move it in the longitudinal direction, i.e., the direction of belt movement. The rollers 72a, however, on which the tire/wheel assembly is supported, allow the tire/wheel assembly 22 to move laterally to facilitate a centering operation, as will be explained.

The entrance conveyor 20, in the preferred embodiment, comprises an assembly including a drive shaft indicated generally by the reference character 80 that is coupled to the drive motor 70 and an idler shaft indicated generally by the reference character 82 around which the belt is reeved. The shafts are rotatably supported by a frame-like structure indicated generally by the reference character 86 which includes a plurality of support legs 88 that are suitably secured to the machine base 12.

Referring to FIGS. 1, 2, 4A, 4B, 14 and 15, the shuttle mechanism 24 serves as a centering device for centering the tire/wheel assembly 22 with respect to the spindle assembly 28, as well as a transport device for conveying the centered tire assembly to the spindle 28a. The shuttle 24 comprises a rectangular frame 24a supported for movement along spaced apart tracks 90a, 90b that are mounted to the base 12. Pairs of track-engaging support legs 92a, 92b extend downwardly from the frame 24a. The lower ends of each pair of support legs are interconnected by a cross beam 94. The pair of support legs 92a slidably engage the associated guide or track 90a whereas the support legs 92b slideably engage the guide or track 90b. Referring also to FIG. 4C, the tracks 90a, 90b are generally square shaped or rectangular shaped and are suitably attached to spaced apart support beams 91a, 91b forming part of the base 12. Bearing blocks 93a, 93b slidably engage the respective tracks 90a, 90b and are secured to base plates 95a, 95b that form part of the shuttle support legs 92a, 92b, respectively. The bearing blocks are secured to the respective base plates by a plurality of fasteners 97 (shown best in FIG. 2).

As seen in FIG. 1, the tracks may be covered with accordion-like or pleated dust covers 99. In the illustrated embodiment, the tracks 90a, 90b are formed by conventional Hiwan rails, available from Hiwan Technology Corporation. The shuttle 24 is thus supported for reciprocating, sliding movement between a centering position and a position at which a tire assembly 22 is aligned with the axis of rotation of the spindle 28a.

The rectangular shaped frame 24a supports a centering/gripping mechanism. Referring in particular to FIGS. 1 and 2, the mechanism includes a pair of laterally moveable grippers 100a, 100b, each gripper including a pair of downwardly extending rollers 102. The grippers 100a, 100b are slidably mounted to spaced apart slides 104 which allow the grippers 100a, 100b to move towards and away from each other. A ball screw 110 concurrently extends through and threadedly engages the grippers 100a, 100b and includes a thread arrangement such that rotation of the ball screw 110 concurrently moves the grippers towards or away from each other, depending on the direction of rotation. An associated bidirectional drive motor 112 is used to rotate the ball screw to move the grippers 100a, 100b towards and away from each other.

Referring in particular to FIGS. 2, 4a, 7 and 8, movement of the shuttle 24 between the centering position and testing position (the position at which the tire assembly is aligned with the spindle assembly 28) is effected by a drive belt 116 that is operatively connected to one side of the shuttle 24 by a coupling member 94a (FIG. 4A). The drive belt 116 is reeved around a drive pulley 118 (FIG. 7) forming part of a drive motor assembly 122 (FIGS. 4A and 7) and an idler pulley assembly 120 (FIGS. 4A and 8). In the preferred embodiment, the drive motor assembly 122 also includes an encoder (not specifically shown) for monitoring the position of the shuttle 24 The drive belt 116 is preferably a cogged or timing type belt so that slippage between the drive pulley 118 and the belt 116 is inhibited in order to assure accurate position monitoring of the shuttle. When the shuttle 24 is to move from the centering position to the testing position, the drive motor 122 is energized to advance the belt 116 and hence the shuttle 24 to the desired position. The encoder which forms part of the drive motor assembly 122 provides constant position information to a controller forming part of the machine, so that the shuttle 24 can be accurately moved or indexed over to the tire testing position.

Figure 15:
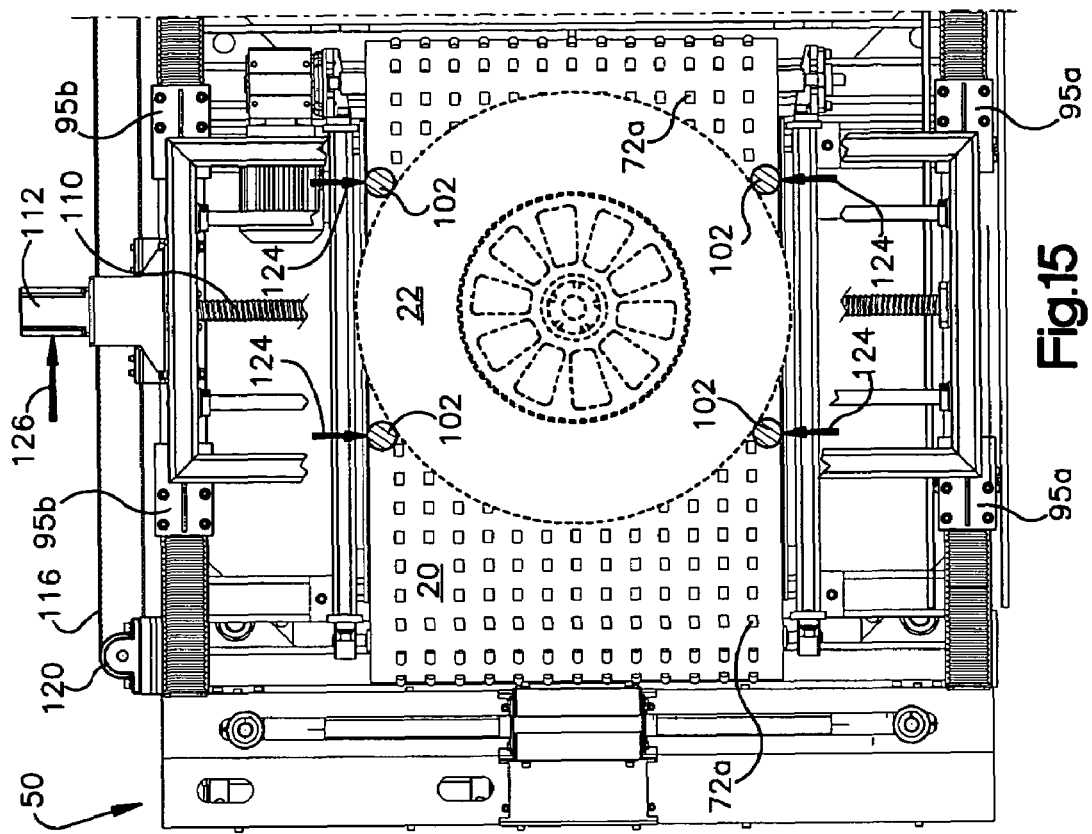
FIG. 15 is another fragmentary, plane view showing certain components in alternate positions, as compared to FIG. 14.
Figure 14:
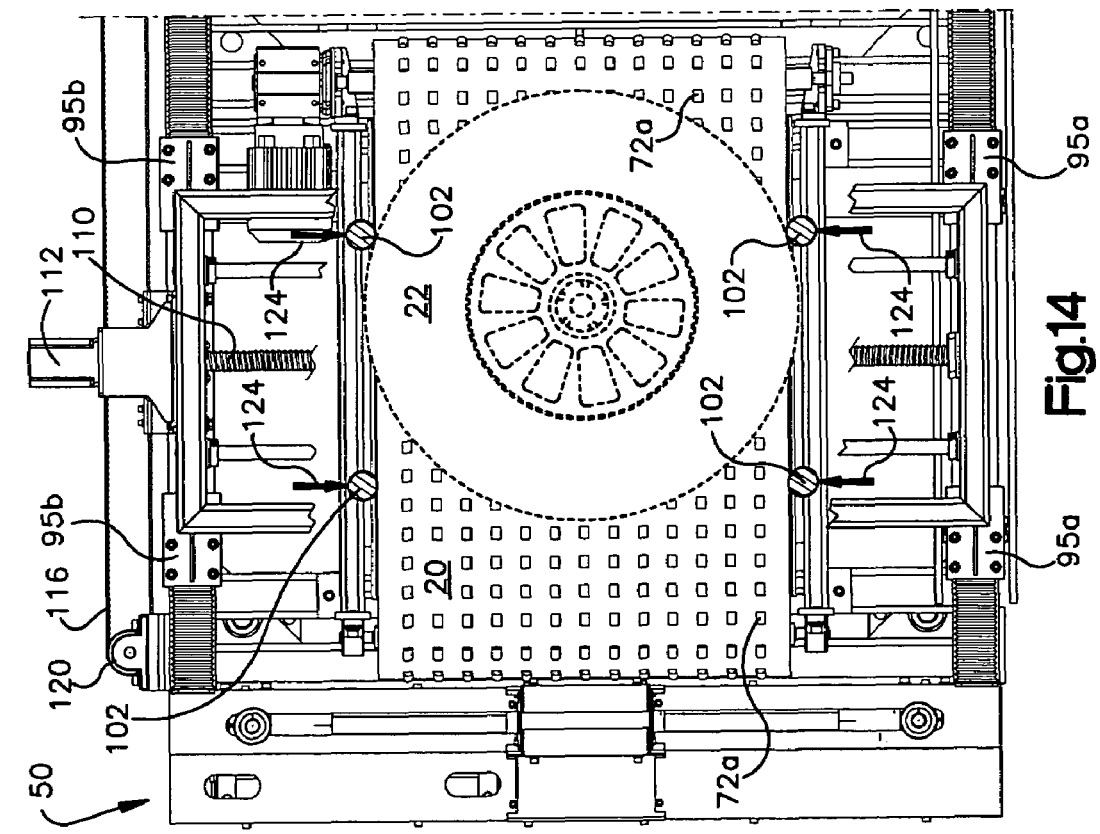
FIG. 14 is a fragmentary, plan view as seen from the plane indicated by the line 14-14 in FIG. 11.

According to a feature of the invention, when the drive motor 122 is not energized, it does allow longitudinal movements in the shuttle 24 while concurrently monitoring the position of the shuttle. This feature facilitates centering of the tire/wheel assembly 22, as will be explained. To achieve centering in the preferred embodiment, the following steps are performed. Referring in particular to FIGS. 14 and 15, the tire assembly 22 is advanced to a centering position by the entrance conveyor 20. Upon reaching the centering position, the ball screw drive motor 112 is energized to move the grippers 100a, 100b towards each other as indicated by the arrows 124 in FIG. 14. As they move towards each other, one or more rollers 102 engage the tire assembly and urge the tire laterally (with respect to the direction of movement of the entrance conveyor 20). If the tire is not laterally centered, the rollers 72a forming part of the conveyor 20 allow the tire assembly 22 the move laterally and, thus, align the center of the tire assembly with the spindle assembly axis 29 (shown in FIG. 2). As the grippers 100a, 100b move towards each other, if the tire assembly 22 is not centered longitudinally with respect to the grippers, the shuttle 24 can move longitudinally in either direction so that the tire is centered longitudinally with respect to the grippers 100a, 100b. This shuttle movement is indicated in FIG. 15 by the arrow 126. It should be noted that the movements indicated by the arrows 124, 126 may occur concurrently rather than sequentially. Without this feature, the tire itself would have to be moved longitudinally within the centering station to achieve centering. Forcing the tire to move longitudinally could prove either difficult or create positioning errors, since the tire would either have to move relative to the conveyor belt 72 in the longitudinal direction, or the conveyor belt 72 would have to move to accommodate the required movement of the tire assembly.

As indicated above, the ball screw motor 112 is energized to drive the grippers 100a, 100b towards each other to effect centering. Once centering is accomplished, the drive motor 112 continues to drive the grippers 100a, 100b towards each other in order to create a clamping force on the tire assembly so that when the shuttle drive motor 122 is energized to advance the shuttle 24, the tire assembly 22 is carried by the shuttle and positioned over the spindle 28 in substantial alignment with its axis of rotation 29.

Figure 4B:
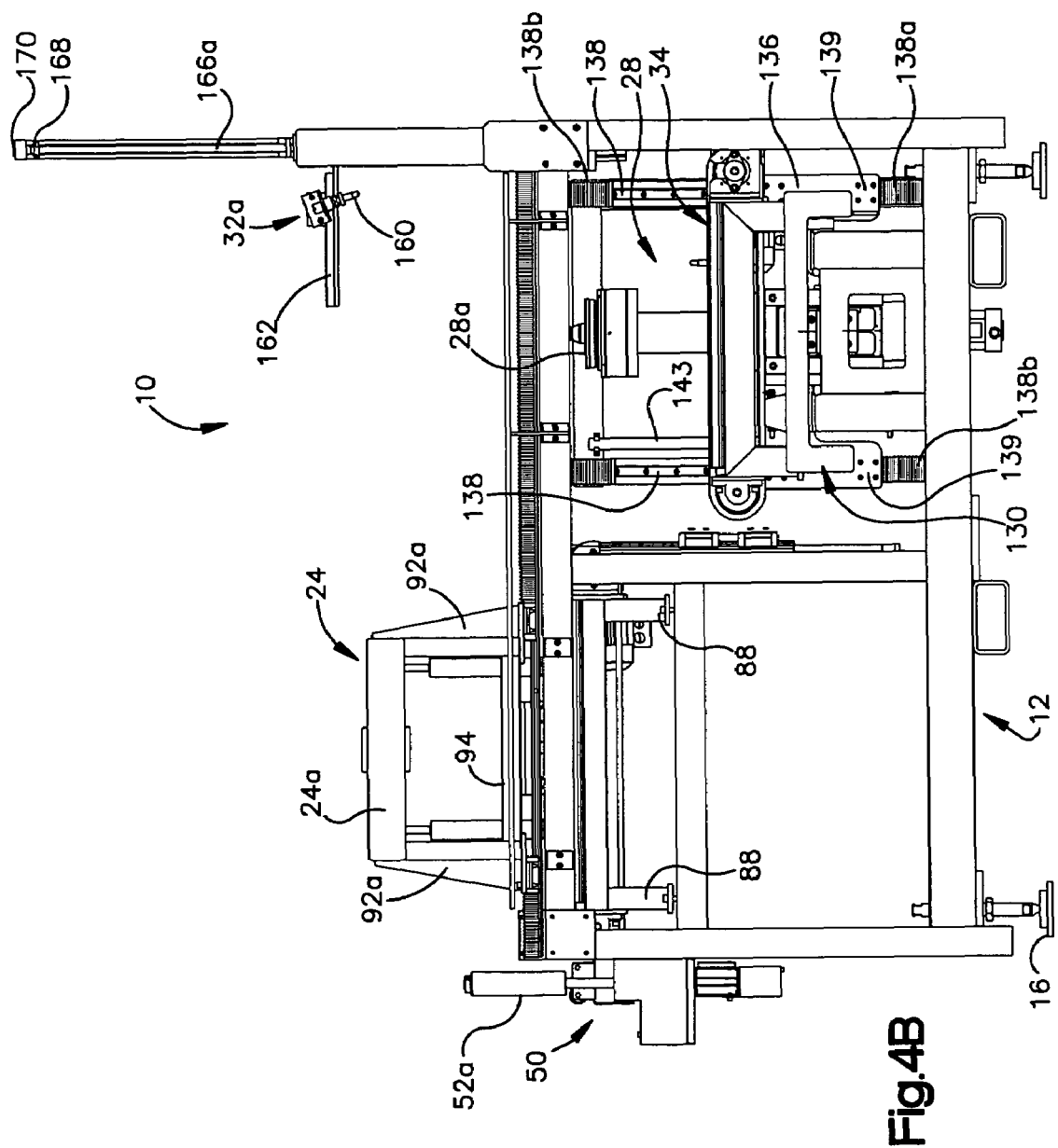
FIG. 4B is another side elevational view as seen from the plane indicated by the line 4B-4B in FIG. 2.
Figure 4C:
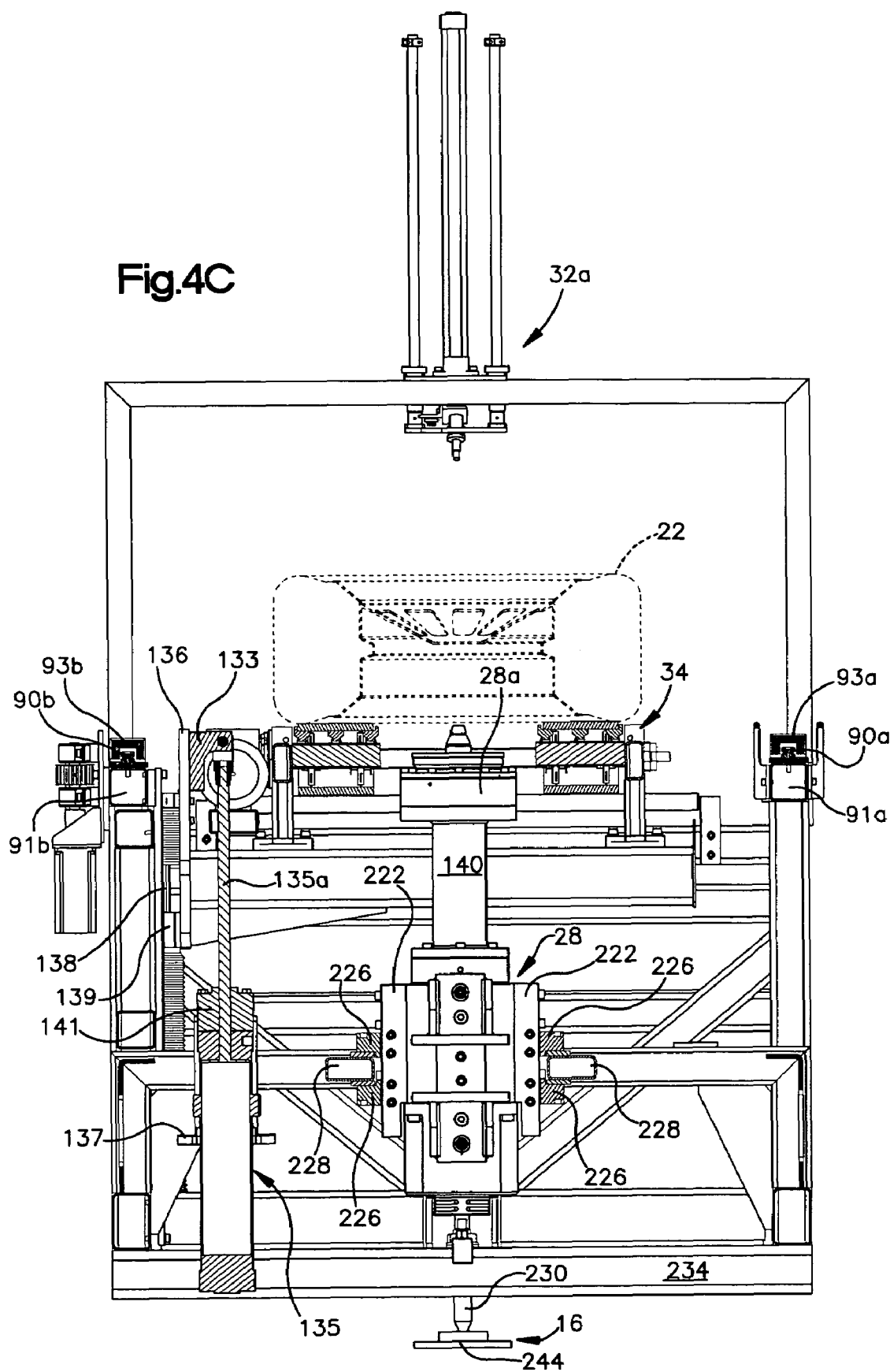
FIG. 4C is a sectional view of the machine as seen from the line 4C-4C in FIG. 2.
Figure 11:
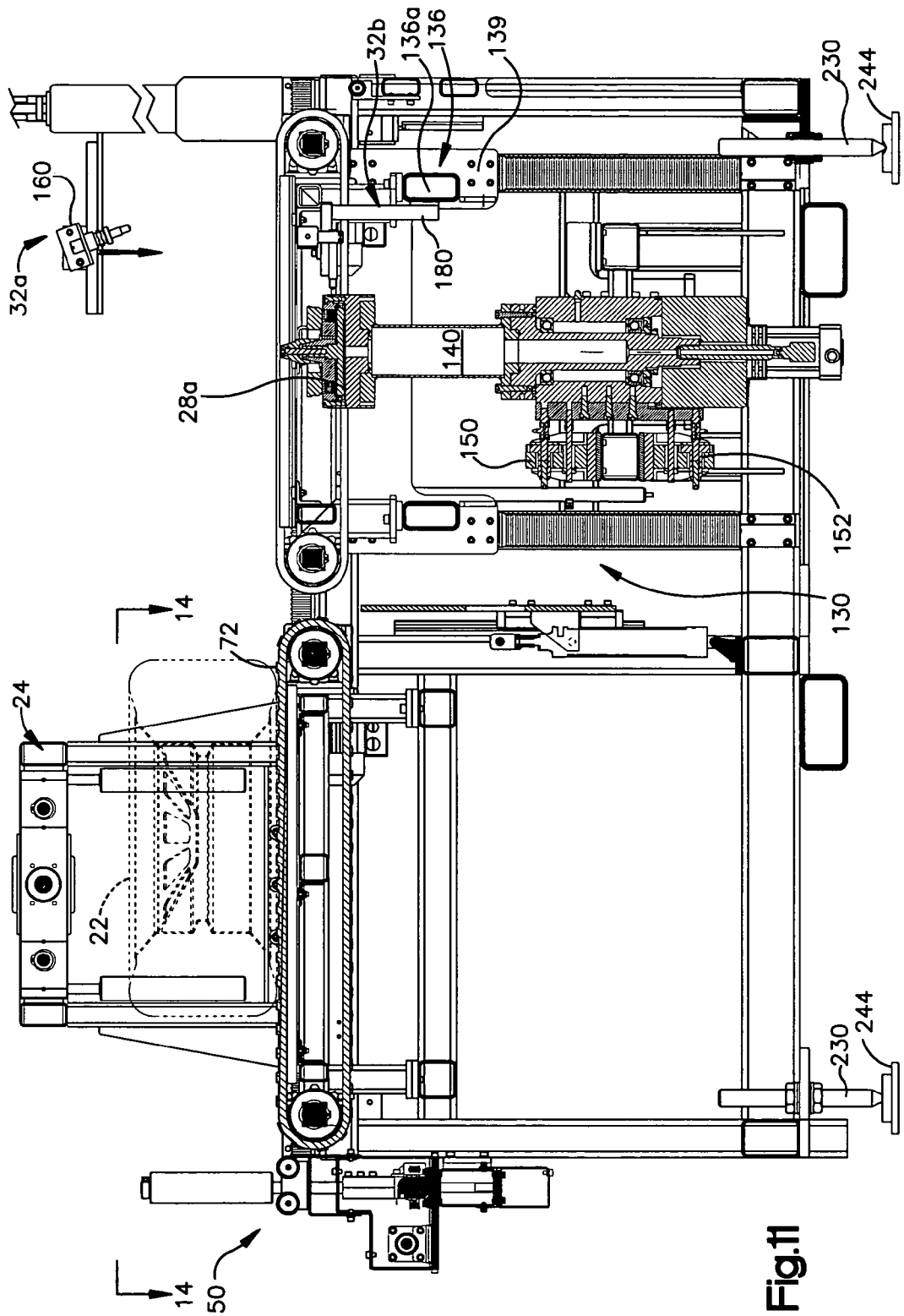
FIG. 11 is a sectional view as seen from the plane indicated by the line 11-11 in FIG. 2.

Referring to FIGS. 2 and 9, the testing station 26 includes an exit or discharge conveyor 34 which is attached to an elevating mechanism indicated generally by the reference character 130 in FIGS. 4B, 4C and 11 by which the conveyor 34 is raised and lowered. As seen best in FIG. 9, the discharge conveyor 34 includes a pair of spaced apart conveyor belts 132 which are driven by a drive motor 134 through a common drive shaft 132a. The discharge conveyor also includes a common idler shaft 132b about which the conveyor belts 132 are reeved. Energizing the drive motor 134 concurrently drives both conveyor belts 132 in order to move a tire assembly out of the testing station 26.

The discharge conveyor 34 is mounted to the elevating mechanism 130 which is operative to reciprocally move the exit conveyor 34 in a vertical direction. In the preferred operational method, the exit conveyor 34 is in its uppermost position when a tire assembly is being transferred from the centering station to the testing station 26 (shown best in FIGS. 4C and 11). When the shuttle 24 reaches the position at which the tire assembly 22 is aligned with the rotational axis 29 of the spindle 28, the ball screw drive motor 112 is reverse operated to move the grippers 100a, 100b apart. This movement of the grippers releases the tire assembly 22 so that it is entirely supported by the raised exit conveyor 34. The shuttle 24 may then return to the centering station in order to receive and center the next tire assembly to be tested. To commence a testing step, the exit conveyor 34 is lowered to place the tire assembly to be tested, on the spindle assembly 28. In the preferred embodiment, the elevator is dropped at a rapid rate and is decelerated as it approaches a predetermined lower position. The predetermined lower position is a function of the size of the tire. Preferably the conveyor 34 is lowered only enough to clear the tire. This operational method decreases overall cycle time for the machine.

In the illustrated embodiment, the raising and lowering of the exit conveyor 34 to predetermined positions is achieved as follows. The exit conveyor 34 is suitably attached to an elevator frame 136 which is vertically movable along a pair of tracks 138 (shown best in FIG. 4B). Suitable bearing blocks indicated generally by the reference character 139 are secured to the frame 136 and are arranged in pairs, each pair slidably engaging one of the tracks 138 (see FIGS. 2, 4B and 4C). The track 138 and bearing blocks 139 are substantially similar to the tracks 90a, 90b and associated bearing blocks 93a, 93b that slidably support the shuttle 24 for horizontal movement. In the illustrated embodiment, the tracks and bearing blocks are available from Hiwan Technology Corporation and are identified as LGR 30 Rail and LGW 30 Block, respectively.

As seen best in FIG. 4B, the tracks 138 may be covered by accordion-like or pleated covers 138a.

Referring to FIG. 4C, the frame 136 and, hence, the discharge conveyor 34 is raised and lowered by an actuator 135. In the preferred and illustrated embodiment, the actuator 135 is a pneumatic actuator and is trunnion mounted to a mounting plate 137 which allows pivotal movement in the actuator to accommodate slight misalignments that may occur between the mounting of the actuator and the elevator frame 136. In particular, the actuator 135 includes an actuating rod 135a having its upper or distal end (as viewed in FIG. 4C) secured to the frame 136 via an inverted L-shaped mounting lug 133 (FIG. 4C). Should the mounting point for the distal end of the actuator rod 135a be slightly misaligned, the actuator 135 can pivot during extension and retraction of the rod to accommodate the misalignment.

According to a feature of this aspect of the invention, the actuator includes a brake member 141 for arresting motion in the actuating rod 135a and for inhibiting retraction or extension of the actuating rod. In accordance with this feature of the invention, the position of the elevator is monitored by a position sensor. In the illustrated embodiment, the position sensor comprises a vertically oriented, tube-like transducer 143 (shown in FIGS. 1, 2 and 4B) mounted in a detecting relationship with respect to the frame 136. Referring in particular to FIG. 2, the transducer 143 is mounted in close proximity to a path of travel for a magnet 143a that is mounted to the frame 136. As the elevator is raised and lowered by the actuator 135, the transducer 143 detects the position of the magnet 143a and, thus, determines the position of the elevator. A suitable distance transducer of the type illustrated is available from Balluff Inc. and denoted as a MicroPulse AT transducer.

By monitoring the position of the frame 136, the machine control system is constantly aware of the elevator position. When the elevator reaches a position at which the control system determines it should stop, the brake 141 (FIG. 4C) is energized to engage the actuating rod 135a to inhibit further movement in the elevator, even though the actuator remains pressurized. The present invention contemplates moving the elevator to predetermined rest positions as well as marking positions (as will be explained). For example, the conveyor 34 may be lowered only to position where the tire/wheel assembly 22 is engaged by the spindle tooling 27 and only a slight gap is defined between the exit conveyer 34 and the bottom of the tire assembly i.e. the position shown in FIG. 16.

Once the exit conveyor 34 is free of the tire assembly, the tire assembly is clamped to the spindle 28 by the tooling 27 that may be conventional. For example, a collet-type device is known in the art which is mounted on the spindle 28a and which includes portions that expand outwardly in order to engage the inside of the wheel spindle hole. The device for clamping the tire assembly to the spindle assembly 28 does not form part of the present invention and further explanation is, therefore, unwarranted.

Once the tire assembly is clamped or fixed to the spindle assembly 28, the spindle 28a is rotated at a predetermined speed. While the tire assembly is rotating, data regarding the imbalance of the tire/wheel assembly is acquired and, in particular, the amount of weight and the locations where corrective wheel weights need to be installed to balance the tire assembly are determined.

Figures 10, 10A:
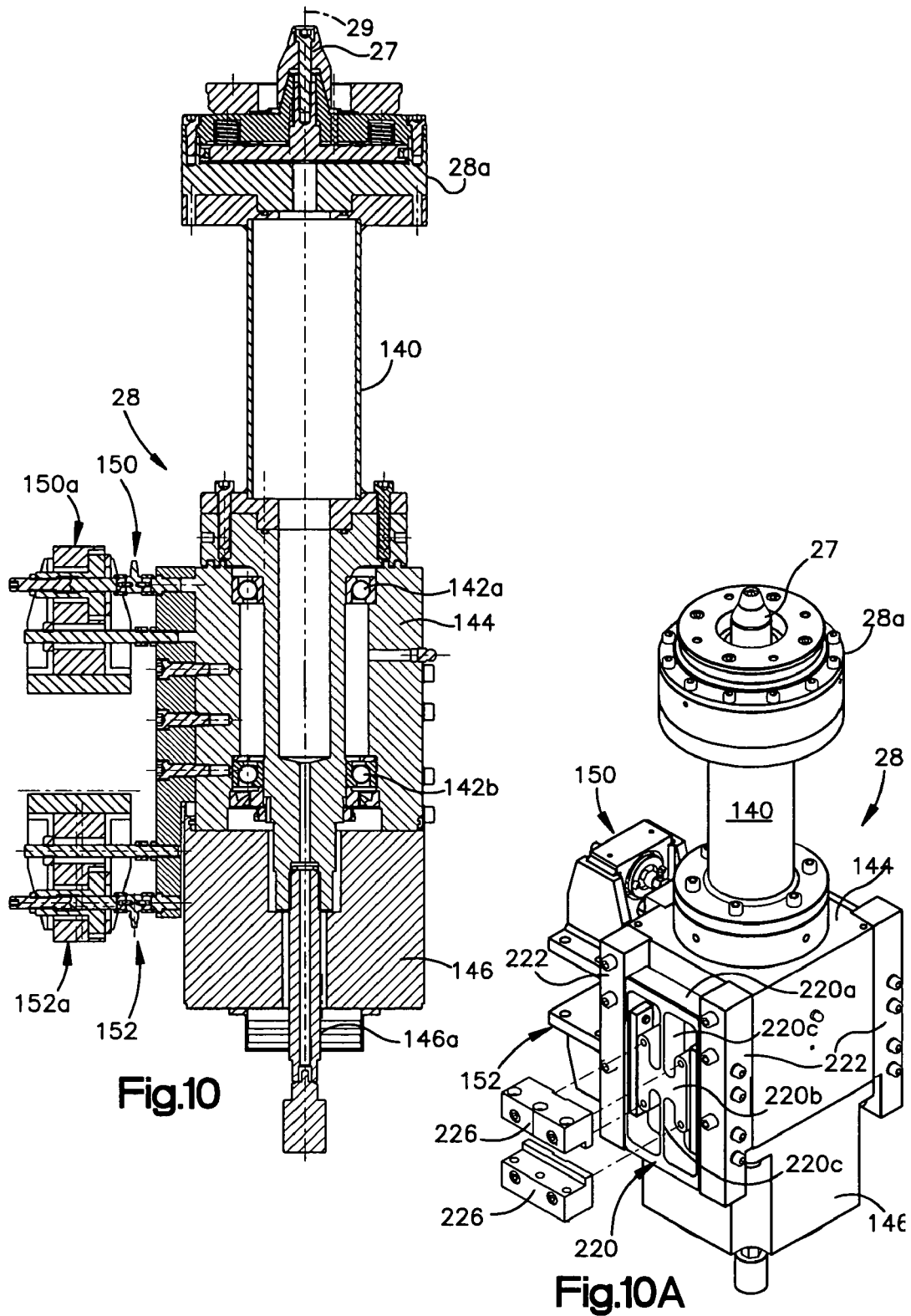
FIG. 10 is a sectional view of a spindle assembly forming part of the machine shown in FIG. 1.
FIG. 10A is a perspective view of the spindle assembly shown in FIG. 10.

FIG. 10 illustrates the construction of the spindle assembly 28. The spindle assembly is carried by the base 12, but includes a mounting arrangement which allows at least portions of the assembly 28 to move in response to tire imbalance. As seen best in FIG. 10, a shaft assembly 140 mounts the tire receiving/clamping tooling 29 at its upper end. A lower end of the shaft assembly 140 is rotatably supported by a pair of spaced apart bearings 142a, 142b held in a stationary housing assembly 144. In accordance with the invention, a drive motor 146 is secured to or forms part of the housing 144 and includes an armature (not shown in detail) operatively coupled to the shaft assembly 140. Energization of the motor 146 rotates the shaft assembly 140 and, hence, the tooling to which the tire assembly 22 is held. In the preferred embodiment, the drive motor 146 is a cartridge-type motor that is available from Danaher Motion under the designation C092. The preferred and illustrated motor 146 does not include internal bearings that directly support an associated armature (not specifically shown). Instead, the armature is maintained in its operative position with respect to the motor housing by the spindle bearings 142a, 142b mounted in the spindle housing 144. With this configuration, the spindle bearings 142a, 142b which are maintenance items, can be easily replaced without requiring disassembly of the drive motor. This configuration also eliminates the need for additional bearings for the drive motor 146 and results in less maintenance and a cleaner data measurement/acquisition by eliminating a source of bearing noise.

As indicated above, the spindle housing 144 is movable within the base 12 in response to forces generated by the imbalance of the tire when the tire assembly is rotating. Data regarding the imbalance is gathered via sensors which, in the illustrated embodiment, comprise a pair of vertically spaced load cells 150, 152.

Referring, in particular, to FIG. 10, the right ends of the load cells 150, 152 are mechanically coupled to the spindle housing 144. Their left ends are coupled to respective mounting assemblies 150a, 152a. The load cells 150, 152 and associated mounting assemblies 150a, 152a are conventional. As is known, the mounts 150a, 152a "ground" or fix the left ends of the load cells and may include components for adjusting the position of the cells to ensure that they are properly aligned with the spindle housing. As is conventional, movements in the spindle housing 144, as a result of forces generated by an imbalanced tire, cause a reaction force at the interface between the load cells 150, 152 and the housing 144. The load cells 150, 152 produce an electrical signal proportional to the extent of movement and the reaction force. Consequently, the signals are proportional to the forces generated by the imbalances in the tire. These signals are then used to generate data regarding the imbalance of the tire assembly 22. Ultimately the data is used to determine the locations on the tire/wheel assembly where appropriately sized, corrective weights need to be applied in order to correct the imbalance. The spindle assembly 28 includes an encoder (not specifically shown) for monitoring the position of the spindle and, hence, the rotative position of the tire assembly 22. As a result, the forces applied to the load cells 150, 152 can be coordinated with the tire position data to arrive at the location where the corrective weights need to be applied and the size of those weights.

Figure 16:
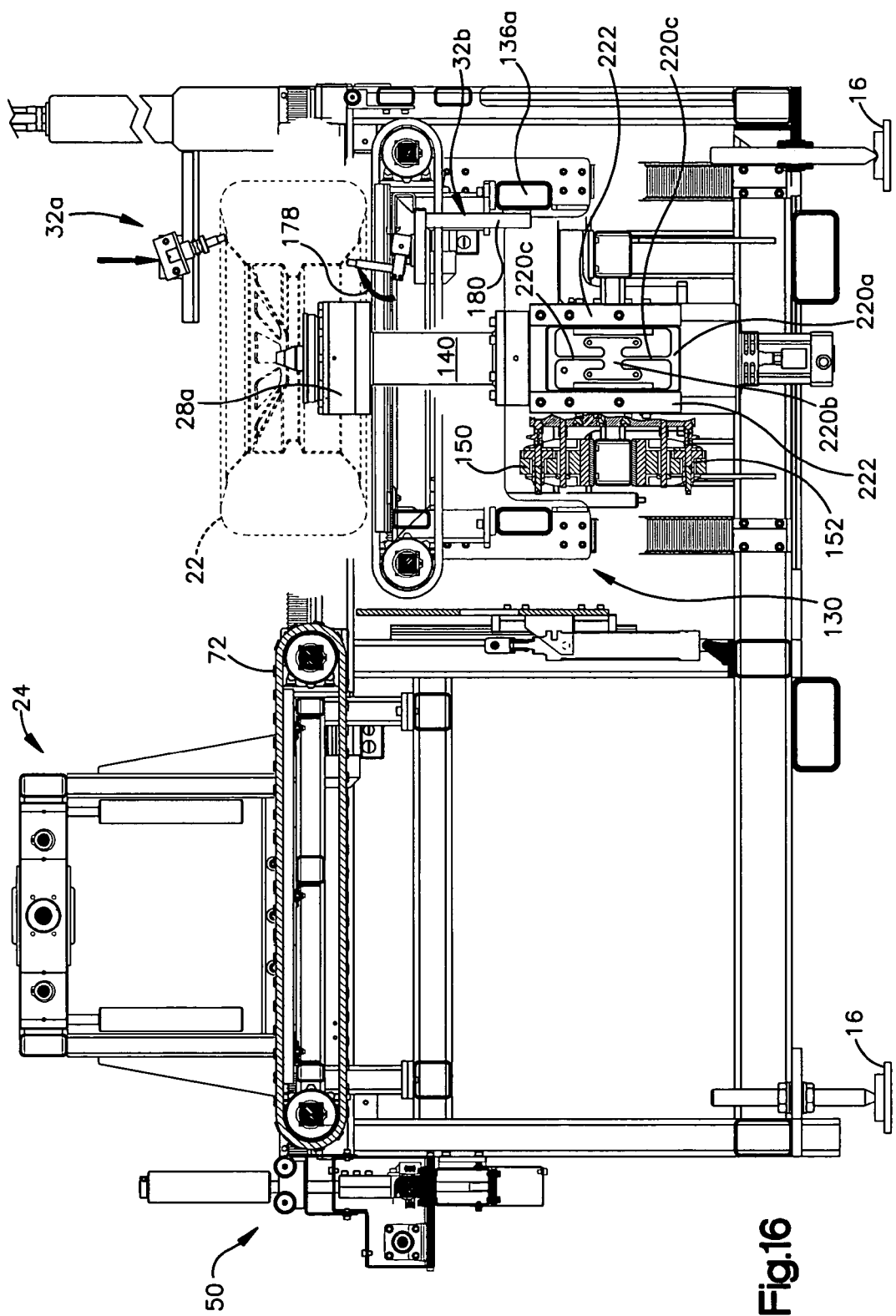
FIG. 16 is another sectional view of the machine as seen from the plane indicated by the line 16-16 in FIG. 2; and, FIG. 17 is a schematic representation of a control system used to control the various functions of the machine shown in FIG. 1.

After the tire imbalance data is acquired, and the amount and locations of the weights are determined, the tire assembly is rotated by the spindle assembly 28 until the position where a weight is to be applied on the upper side of the assembly 22 is aligned with the upper tire marker mechanism 32a. Referring to FIGS. 1, 2 and 11, the upper tire marker mechanism 32a includes a marking device 160 adjustably mounted to a carrier 162. The carrier 162 forms part of a slide mechanism that includes a pair of vertical slide members 166a, 166b which each include a stop elements 168 at their upper end. Intermediate the slide members 166a, 166b is mounted a fluid pressure operated actuator 170, such as a pneumatic actuator, which is operatively connected to the carrier 162 for the marking device 160. Pressurization of the actuator 170 causes an actuating rod 170a (FIG. 3) connected to the carrier 162 to be driven downwardly until the marking device 160 contacts the tire wheel assembly 22 and places a suitable mark indicating the location of where a weight needs to be applied (the marking position for the marker 32a is shown in FIG. 16). The stop elements 168 determine the distance to which the marking device 160 descends.

Following the marking of the upper side of the tire assembly, the spindle 28a is then rotated or indexed until a lower side of the tire assembly 22 is aligned with the lower marking mechanism 32b (see FIGS. 11, 12 and 16). FIG. 12 illustrates the details of the lower marking mechanism. Unlike the upper marking mechanism, the lower marking mechanism 32b uses a rotating motion in order to mark the lower side of the tire assembly (the motion is indicated by the arrow 178 in FIG. 16). As seen in FIGS. 11 and 16, a vertical support bar 180 is suitably attached to an elevator frame member 136a via a mounting plate 180a (shown in FIG. 12). Referring in particular to FIG. 12, atop the support bar 180 is an adjustment slide 184 adapted to adjustably receive the lower marking mechanism 32b. The mechanism 32b includes a lateral mounting plate 186 which sits atop the adjustment slide 184. A pair of socket bolts 187 is adapted to extend through apertures in the mounting plate and are received in associated threaded holes in a clamping plate 188. The clamping plate 188 is sized to engage the underside of a pair of inwardly turned flanges 184a so that when the bolts 187 are tightened the curved flanges 184a are clamped between the mounting plate 186 and clamping plate 188 to therefore secure the position of the lower marking mechanism 32b.

The mechanism 32b includes an actuator or motor 190 adapted to rotate a marker device mounting arm 194 through an arc of substantially 90°. The rotatable arm 194 is adapted to removably receive a marking device or pen 196. As seen in FIG. 11, the body of the pen 196 is received in a bore 198 formed in the arm 194. A slot 198a extends from outside the arm into the bore 198 to form clamping portions 200a, 200b. Bolts 202 extending through bores in one portion 200a engage threaded bores in the opposite portion 200b, such that tightening of the bolts 202 squeezes the portions 200a, 200b together to thereby clamp the marking device 196 within the bore 198.

The disclosed mechanism provides several advantages for the lower marker. In its rest position, the marking device 196 is rotated to the horizontal position 196' shown in phantom. By maintaining the marking device 196 in a horizontal position when not in use, the marking fluid within the marker continues to wet the marking tip. In addition, because the marking pen rotates the marking tip through an arc, the mark left by the marker as it rotates into contact with the tire assembly is a line rather than a dot. It is believed that providing a line as the mark aids in the installation of the corrective weight, especially if it is an adhesively held weight that is placed on the inside of the wheel, a spaced distance from the bead defined by the wheel rim.

After the lower marking mechanism 32b is activated to mark the position on the underside of the wheel assembly 22b where a corrective weight is to be placed, the tire is lifted off the spindle tooling by raising the exit conveyor 34. The tire assembly is thus lifted off the spindle assembly 28 whereupon the exit conveyor drive motor 194 is energized to rotate or advance the belts 132 thereby driving the tire assembly out of the machine and delivering it to a weight applying piece of equipment or alternately, onto another conveyor.

Referring, in particular, to FIG. 16, the underside of the tire is marked by raising or lowering the elevator 130 until the lower marker 32b is positioned an appropriate distance from the tire wall so that upon rotation of the marking device 196, a mark will be placed on the tire (or wheel). This relationship is seen best in FIG. 16. It should be noted here that for some operations, the elevator 130 may move downwardly directly to its marking position as it lowers the tire onto the spindle at the start of the test cycle. In other words, as the conveyer 34 moves downwardly to place the tire assembly 22 onto the spindle 28a, it stops at the marking position so that the lower marker 32b is available for marking at the conclusion of the test cycle without requiring further movement of the elevator.

Alternately, the elevator 130 may be lowered to an intermediate or fully lowered position at the commencement of the test cycle and, at the conclusion of the test cycle, the elevator 130 is raised to the marking position in order to effect marking of the tire. According to a feature of this invention, and as seen best in FIG. 2, a pair of spaced apart marking assemblies may be secured to the elevator (the other marking assembly is indicated by the reference character 32b' in FIG. 2). Both marking mechanisms 32b, 32b' operate substantially the same. However, the markers can be adjusted so that the marking pens place a mark at different radial positions on the tire/wheel assembly 22. The use of two markers enables two radially different locations to be marked on the tire/wheel to correct an imbalance condition. The dual lower marker arrangement would be used, for example, in situations where a corrective weight is to be placed at a "mid-plane" location, as well as at a rim location. Corrective weights placed in this arrangement are often used for tire/wheel assemblies where it is undesirable to install corrective weights on the outside or "curbside" of the wheel. The present invention provides an automated apparatus for placing both a rim mark and a mid-plane mark on the underside of the tire/wheel assembly.

The ability to stop the elevator at any position along its path of travel using the actuator brake 141 greatly facilitates the tire marking function. In addition, this feature improves cycle time because time is not expended waiting for the conveyor 34 to raise from its lowermost position to the point where it again contacts the tire/wheel assembly 22 in order to lift it off the spindle 28.

It should be noted here that in the disclosed operation, the tire assembly 22 was assumed to require corrective weights on both the upper (curb side) and lower sides of the tire assembly. However, it is possible that a given tire/wheel assembly may only require corrective weights on one side of the tire assembly.

In those circumstances, only the appropriate marking mechanism is activated after the spindle assembly rotates the tire assembly 22 to the appropriate position.

As indicated above, the spindle assembly 28 is mounted within the base 12, such that it can move towards and away from the load cells 150, 152 in response to forces generated by imbalances in the tire. These movements are typically very small, but are enough to cause the load cells 150, 152 to which the spindle assembly 28 is attached, to generate appropriate force-related signals.

In the illustrated embodiment, the spindle assembly 28 is mounted such that it is constrained to move only in a lateral direction, towards and away from the load cells. Referring to FIGS. 10A and 16, this is achieved using a pair of suspension springs 220 (one is shown in FIG. 10A) which are secured to the housing 144 by retaining bars 222. A suspension spring 220 is mounted on each side of the spindle housing 144 although only one spring 220 is shown in FIG. 10A. Referring also to FIG. 16, each suspension spring 220 includes a perimeter portion 220a which is rigidly secured to the housing by the retaining bars 222. The perimeter portion 220a serves as a carrier for a centrally suspended mounting plate 220b. The mounting plate 220b is connected to the perimeter portion 220a by vertically extending suspension segments 220c. The suspension spring segments 220c are relatively thin compared to other portions of the spring 220 and can flex to allow lateral movement in the mounting plate 220b. Vertical movement of the mounting plate 220b, however, is substantially inhibited. A pair of mounting lugs 226 is secured to the mounting plate 220b in a vertical, spaced apart relationship. As seen best in FIG. 4C, the mounting lugs 226 are rigidly secured to associated frame members 228 forming part of the base 12. Since the mounting lugs 226 are attached directly to the suspended mounting plate 220b (which can move laterally) the lugs 226 can move relative to the housing 144 if a lateral force is applied to the housing. In this way, the spindle assembly is mounted to the base using a suspension spring arrangement that enables the spindle housing 28 to move laterally with respect to the load cells while substantially resisting movement in other directions.

FIG. 13 illustrates the construction of the machine support member 16. The support member includes a stud 230 having a threaded segment 230a threadedly received in a frame member 234 forming part of the base 12. The threaded segment 230a includes a lock nut 236 and washers 238 by which the position of the stud 230 can be locked to the frame member 234. The lower end of the stud terminates in a cone-shaped surface 240 which is received in a similarly shaped cone-shaped surface 244a formed in a receiver 244 that is suitably secured as by threaded fasteners 246 to the plant floor. In the preferred and illustrated embodiment, the cone-shaped or tapered surface 240 defined by the lower end of the support stud 230 has a tapered angle that is smaller than the angle of the recess 244a so that side portions of the cone surface 240 do not engage the cone surface 244a of the receiver 244. As a result, the weight of the machine is transmitted through point contact between the tip of the cone and the recess 244a. With the disclosed arrangement, the weight vector generated by the machine exerts only a vertical force on the mounts 16. Lateral forces that would be generated if the legs of the base were fastened directly to the plant floor in a slightly misaligned condition are avoided. Moreover, by using three support members (rather than four), leveling of the machine is easily achieved by adjusting the relative position of the threaded studs 230 in the associated frame members 234. According to a feature of the invention, four leg segments 250a extend downardly from corner posts 250 forming part of the base 12 and add further stability to the machine should the machine experience a tipping movement. Should the machine tip, one or more segments 250 will contact the plant floor to stabilize the machine base 12.

Figure 17:
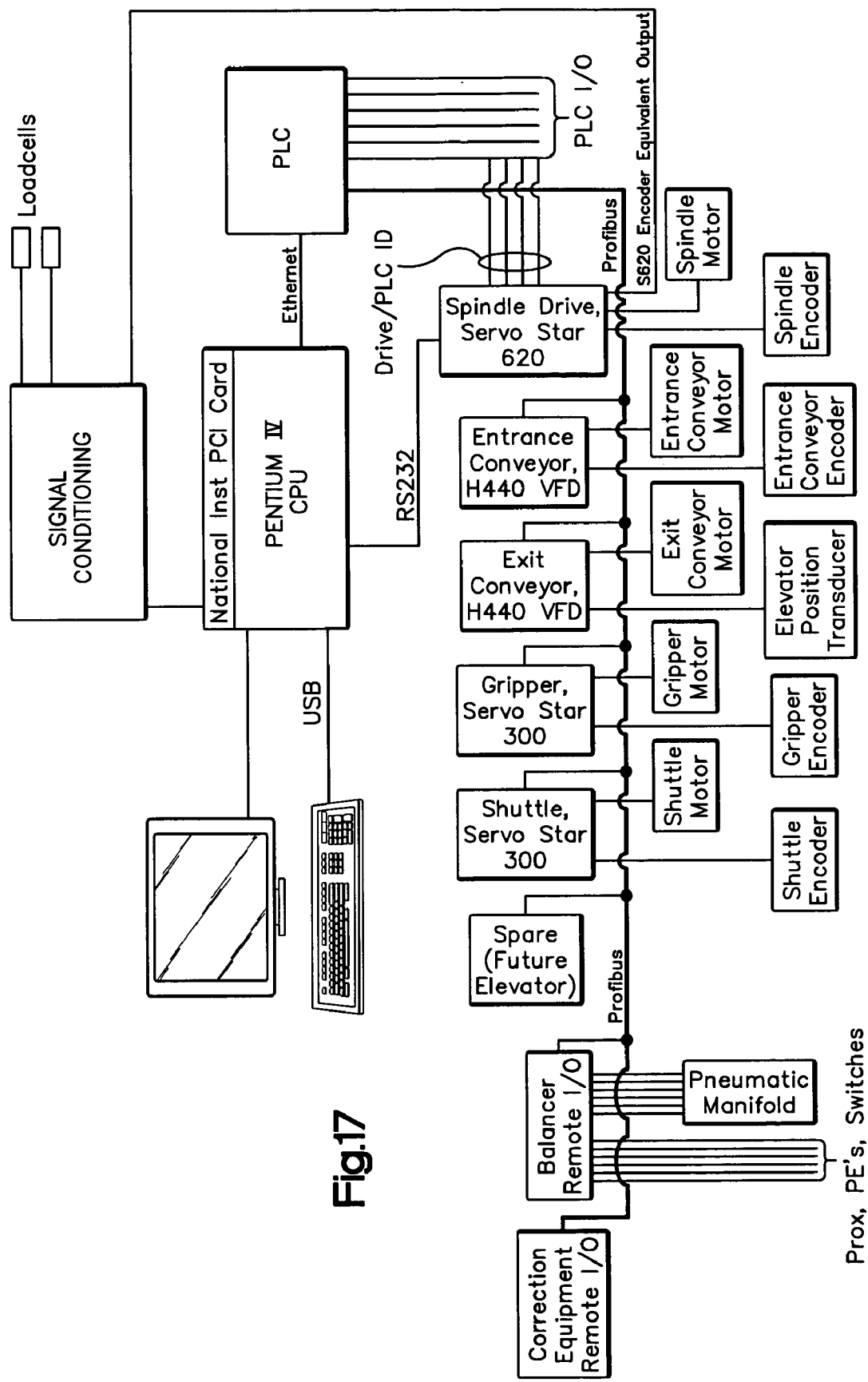

FIG. 17 schematically illustrates a control system for controlling the various functions of the machine 10. In the illustrated embodiment, a Pentium IV based PC is used to communicate control signals and receive data from the spindle assembly and load cells. Conventional control circuitry in cooperation with a PLC are used to control the shuttle motor 120, the ball screw motor 112, the exit conveyor motor and entrance conveyor motor. As seen in this schematic, a shuttle encoder, gripper encoder, and entrance conveyor encoder constantly monitor the position of these devices. The elevator position transducer 143 monitors the position of the elevator and, hence, the discharge conveyer. A conventional keyboard is connected to the CPU via a USB connection and a conventional video monitor displays information to the operator. Those skilled in the art will recognize that suitable software must be written that is compatible with the PLC in order to effect control over the various drive motors. The software itself can be readily written by those skilled in the art and is dependent upon the types of components selected and the manufactures of those components.

The present invention has been described as it would be used as part of a tire/wheel assembly balancing machine that includes spaced apart tire centering and balance measuring positions. It should be understood, however, that principles of this invention can be utilized in other types of machines, such as machines that center and measure balance of a tire/wheel assembly at a single location. Alternately, the principles of the invention can be applied to a machine in which the tire assembly is centered and measured at one location and then is conveyed to a spaced apart position where it is marked.

Finally, the invention has been described as it would be used on a wheel mounted tire (a tire assembly). The principles of the invention can be applied to a machine for measuring balance of a tire alone, as well as a machine for measuring balance on a wheel alone. The invention and the attendant claims should not be limited to tire/wheel assemblies. In particular, the term "tire" as used in the claims is intended to cover a tire alone, a tire mounted to a wheel, as well as a wheel alone (a wheel without a tire mounted to it).

Although the invention has been described with a certain degree of particularity, it should be understood that those skilled in the art can make various changes to it without departing from the spirit or scope of the invention has hereinafter claimed.

We claim:

1. A balancing machine for performing balance measurements on a tire/wheel assembly, comprising:

a structure defining a tire centering position and a tire testing position, said tire testing position being spaced from said tire centering position;

a first conveyor for moving the tire/wheel assembly to be tested to said centering position and for supporting said tire during a centering operation, wherein said first conveyor includes a plurality of rollers each having an axis of rotation oriented in a longitudinal direction such that the tire/wheel assembly supported by said first conveyor is permitted to move in a lateral direction with respect to said first conveyor, during a centering operation;

a second conveyor moveably coupled to said structure;

a shuttle assembly operative to center said tire/wheel assembly to be tested at said centering position and being further operative, in cooperation with said first conveyor and said second conveyor, to move the tire/wheel assembly to the testing position, wherein said shuttle assembly is further operative to engage said tire/wheel assembly after it has been centered and maintain its engagement with said tire/wheel assembly as said tire is moved from the centering position to the testing position;

a spindle assembly associated with said structure at the tire testing position, said spindle assembly for acquiring balance data on the tire/wheel assembly and marking a location on the tire/wheel assembly for a balancing weight to be added, wherein the spindle assembly includes a rotatable spindle for spinning the tire/wheel assembly;

wherein said second conveyor is operable to discharge the tire/wheel assembly after it has been tested, and wherein said second conveyor is located downstream of said first conveyor; and an elevator mechanism coupled to the structure and associated with the second conveyor for raising and lowering the tire/wheel assembly with respect to the rotatable spindle.

2. The balancing machine of claim 1 wherein said first conveyor permits movement of said tire/wheel assembly in said lateral direction during a centering operation while substantially resisting relative movement between said tire/wheel assembly and said conveyor in said longitudinal direction.

3. The balancing machine of claim 1 wherein said shuttle assembly includes a pair of grippers that are concurrently movable towards and away from each other in said lateral direction.

4. The balancing machine of claim 1 wherein said shuttle assembly is moveably mounted for movement in said longitudinal direction and further including a drive mechanism for moving said shuttle assembly between said centering position and said testing position, said shuttle assembly further comprising grippers operable to move towards and away from each other and operable to apply a lateral centering force and to hold said tire/wheel assembly, said drive mechanism operable to move said shuttle assembly longitudinally to align said grippers with the tire.

5. A tire balancing machine for receiving a tire/wheel assembly and developing balancing data, the balancing machine comprising:
a structure defining a centering position and a testing position, wherein the centering position and testing position are longitudinally spaced;
a first conveyor coupled to said structure and operable to receive the tire/wheel assembly and move the tire/wheel assembly longitudinally from the centering position towards the testing position, wherein the first conveyor further comprises a plurality of rollers on an external surface of said first conveyor and wherein each of said plurality of rollers has an axis of rotation orientated longitudinally such that they facilitate lateral movement on the first conveyor;
a spindle assembly coupled to the structure at the testing position, the spindle assembly for receiving the tire/wheel assembly, spinning said tire/wheel assembly, developing balancing data and marking a desirable location for a balancing weight to be added to the tire/wheel assembly;
a tire shuttle assembly for laterally centering, in cooperation with the first conveyor, the tire/wheel assembly, and for longitudinally moving the tire/wheel assembly to the spindle assembly, the tire shuttle assembly comprising a shuttle frame, a plurality of shuttle legs coupled to the shuttle frame, the shuttle legs moveably coupled to the structure to allow the tire shuttle assembly to move longitudinally between the centering positioning and testing position, a plurality of laterally moveable grippers moveably coupled to said shuttle frame and operable to selectably move towards or away from each other, a first shuttle motor coupled to said shuttle frame for moving said grippers towards each other or away from each other;
a second conveyor operable to move the tire/wheel assembly from the testing position to an exit position; and
an elevator for moving the second conveyor perpendicularly to both the longitudinal and lateral axes and operable to selectably make the second conveyor engage and disengage the tire/wheel assembly at the testing position.

* * * * *